United States Patent
Kim et al.

(10) Patent No.: US 9,503,650 B2
(45) Date of Patent: Nov. 22, 2016

(54) ZOOM-TRACKING METHOD PERFORMED BY IMAGING APPARATUS

(71) Applicant: HANWHA TECHWIN CO., LTD., Changwon-Si (KR)

(72) Inventors: Daebong Kim, Changwon-si (KR); Youngsang Kwon, Changwon-si (KR); Jungkyung Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 86 days.

(21) Appl. No.: 14/658,314

(22) Filed: Mar. 16, 2015

(65) Prior Publication Data

US 2015/0312484 A1 Oct. 29, 2015

(30) Foreign Application Priority Data

Apr. 29, 2014 (KR) .......................... 10-2014-0051914

(51) Int. Cl.
| | |
|---|---|
| H04N 5/262 | (2006.01) |
| H04N 5/232 | (2006.01) |
| G03B 13/36 | (2006.01) |
| G03B 5/00 | (2006.01) |

(52) U.S. Cl.
CPC ............ *H04N 5/23296* (2013.01); *G03B 5/00* (2013.01); *G03B 13/36* (2013.01); *H04N 5/23212* (2013.01); *G03B 2205/0046* (2013.01); *G03B 2205/0053* (2013.01)

(58) Field of Classification Search
None
See application file for complete search history.

(56) References Cited

U.S. PATENT DOCUMENTS

| | | | | |
|---|---|---|---|---|
| 2006/0140608 | A1* | 6/2006 | Triteyaprasert | G02B 7/282 396/79 |
| 2012/0105590 | A1* | 5/2012 | Fukumoto | H04N 5/23216 348/46 |
| 2014/0185870 | A1* | 7/2014 | Yoshida | H04N 5/23212 382/103 |
| 2014/0192162 | A1* | 7/2014 | Aoki | G02B 7/34 348/46 |
| 2014/0341553 | A1* | 11/2014 | Kikuchi | G02B 7/282 396/81 |
| 2014/0354781 | A1* | 12/2014 | Matsuyama | H04N 5/23212 348/49 |

FOREIGN PATENT DOCUMENTS

| | | | |
|---|---|---|---|
| JP | 2000-258680 A | | 9/2000 |
| KR | 10-2004-0034244 | * | 4/2004 |
| KR | 10-2004-0034244 A | | 4/2004 |
| KR | 10-1129385 B1 | | 3/2012 |
| KR | 10-1293245 B1 | | 8/2013 |

OTHER PUBLICATIONS

Title: Translation of KR10-2004-0034244 Date: Apr. 2004 Author: Kim et al.*

* cited by examiner

*Primary Examiner* — Twyler Haskins
*Assistant Examiner* — Wesley J Chiu
(74) *Attorney, Agent, or Firm* — Sughrue Mion, PLLC

(57) ABSTRACT

Provided is an improved zoom-tracking method. A point or two points between a Wide point and a Tele point are chosen, histogram information is stored, and a distance to a subject is estimated based on the stored histogram information. A locus curve is selected based on the estimated distance to the subject, and zoom-tracking is performed along the locus curve after a zoom lens reaches a specific point.

18 Claims, 5 Drawing Sheets

ZOOM-TRACKING METHOD PERFORMED BY IMAGING APPARATUS

CROSS-REFERENCE TO THE RELATED PATENT APPLICATION

This application claims priority from Korean Patent Application No. 10-2014-0051914, filed on Apr. 29, 2014, in the Korean Intellectual Property Office, the disclosure of which is incorporated herein in its entirety by reference.

BACKGROUND

1. Field

Methods and apparatuses consistent with exemplary embodiments relate to zoom-tracking that is performed in an imaging apparatus.

2. Description of the Related Art

Zoom-tracking is a function for focusing on a subject to be photographed by controlling a focus lens while a zoom lens moves. Since a size of the subject, a brightness of a screen, etc., change when the zoom lens moves, if the focus lens does not move properly, focusing is not achieved. Accordingly, in order to achieve focusing as the zoom lens moves, the focus lens has to automatically move to an in-focus position.

SUMMARY

Exemplary embodiments of the inventive concept may be able to prevent a zoom-tracking speed from being reduced as a zoom magnification is changed to a magnification corresponding to a Tele point during a zoom-tracking process.

The exemplary embodiments may be also able to prevent a zoom-tracking speed from being reduced even at a low illuminance or in an environment where a spot light source exists.

According to an aspect of an exemplary embodiment, there is provided an improved zoom-tracking method which may include: choosing a first point and a second point between a Wide point and a Tele point, wherein the first point is closer to the Wide point than the second point; storing distance information about a subject as histogram information by performing auto-focusing (AF) while a zoom lens moves from the first point to the second point; estimating a distance to the subject based on the histogram information while the zoom lens moves from the second point toward the Tele point; selecting a locus curve based on the estimated distance to the subject; and performing zoom-tracking along the selected locus curve after the zoom lens reaches the second point.

When the distance information about the subject is stored as the histogram information, the first point may be set as one from among a point that is ⅔ between the Wide point and a Mid point and a point at which resolution is ensured according to characteristics of a lens moving between the Wide point and the Mid point, wherein the Mid point is located between the Wide point and the Tele point and is a point corresponding to an inflection point of the locus curve.

When the distance information about the subject is stored as the histogram information, the second point may be set as a point that is ½ between the Mid point and the Tele point, wherein the Mid point is a point corresponding to an inflection point of the locus curve.

BRIEF DESCRIPTION OF THE DRAWINGS

The above and other aspects of the inventive concept will become more apparent by describing in detail exemplary embodiments thereof with reference to the attached drawings, in which.

DETAILED DESCRIPTION OF THE EXEMPLARY EMBODIMENTS

As used herein, the term "and/or" includes any and all combinations of one or more of the associated listed items. Expressions such as "at least one of," when preceding a list of elements, modify the entire list of elements and do not modify the individual elements of the list.

A zoom-tracking method determines a distance to a subject by using zoom magnification (e.g., Wide to Tele) and a position of a focus lens. When a zoom magnification is changed from a previous zoom magnification to a current zoom magnification, a lens moves from a position of a focus lens corresponding to the previous zoom magnification to a position of the focus lens corresponding to the current zoom magnification.

However, as a zoom magnification is changed from Wide to Tele and a focus range is increased from Near to Far, a range in which auto-focusing (AF) is performed to obtain a locus curve is increased. Accordingly, as the zoom magnification is changed to Tele, a zoom-tracking speed is reduced. Also, when the zoom magnification is changed, a size and a brightness of a subject are also changed, thereby degrading performance at a low illuminance or in an environment where a spot light source exists.

In order to address these problems, one or more exemplary embodiments of the inventive concept may be able to prevent a zoom-tracking speed from being reduced as a zoom magnification is changed to Tele during a zoom-tracking process.

Also, one or more embodiments of the inventive concept may be able to prevent a zoom-tracking speed from being reduced even at a low illuminance or in an environment where a spot light source exists.

Figure 1:
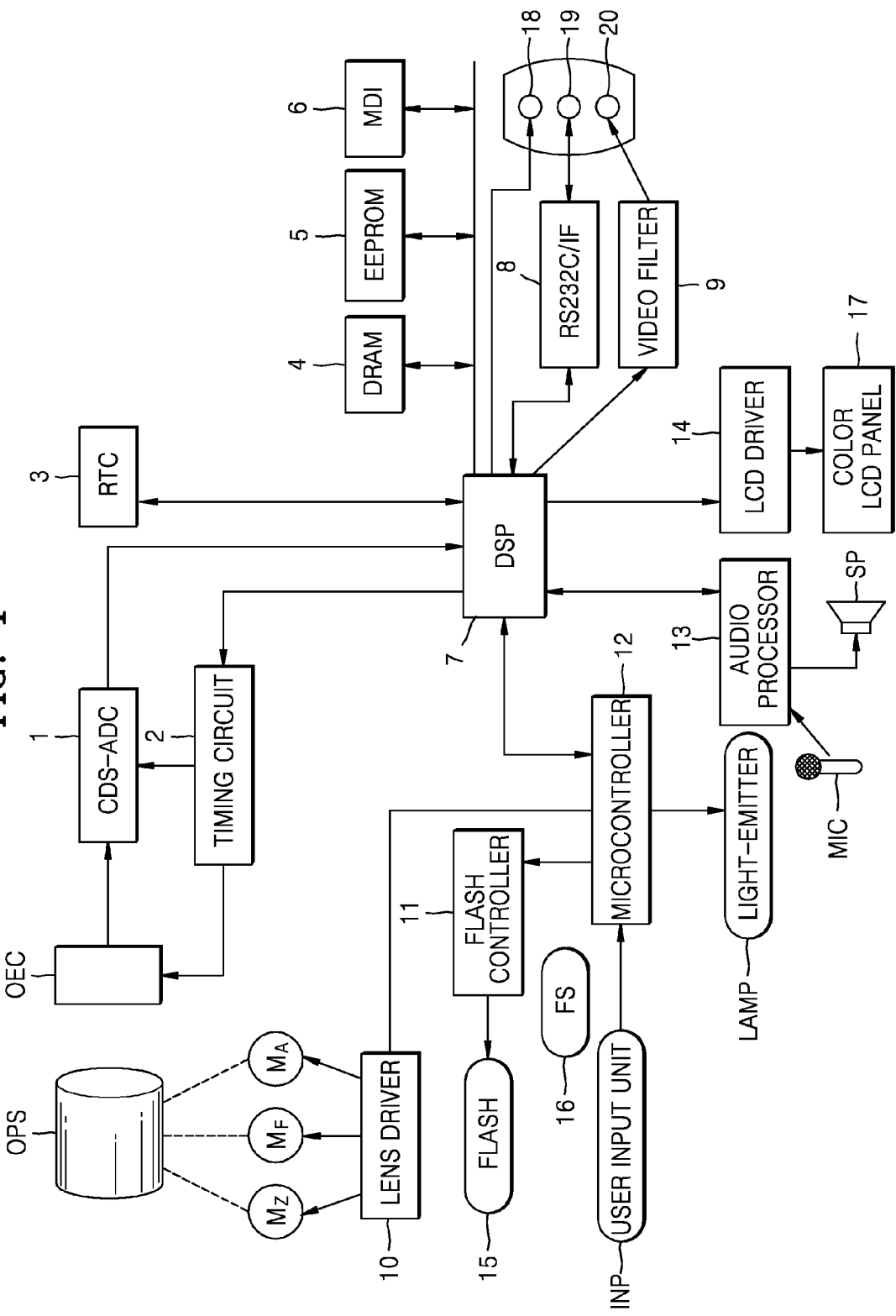
FIG. 1 is an internal block diagram illustrating a digital camera that is an imaging apparatus, according to an exemplary embodiment.

FIG. 1 is an internal block diagram illustrating a digital camera that is an example of an imaging apparatus, according to an exemplary embodiment.

An optical system OPS including a lens unit and a filter unit optically processes light from a subject. The lens unit of the optical system OPS includes a zoom lens, a focus lens, and a compensation lens.

A photoelectric converter OEC of a charge-coupled device (CCD) or a complementary metal-oxide-semiconductor (CMOS) converts light from the optical system OPS into an electrical analog signal. A digital signal processor (DSP) 7 controls operations of the photoelectric converter OEC and an analog-digital converter by controlling a timing circuit 2. A correlation double sampler and analog-to-digital converter (CDS-ADC) 1, that is the analog-digital converter, processes the electrical analog signal that is output from the photoelectric converter OEC to remove high frequency noise from the electrical analog signal and perform automatic gain control (AGC), and converts the electrical analog signal into a digital signal. The DSP 7 processes the digital signal that is output from the CDS-ADC 1 and generates a digital image signal that is divided into a luminance signal and a chrominance signal.

The digital image signal from the DSP 7 and other data are temporarily stored in a dynamic random-access memory (DRAM) 4.

An algorithm and configuration data that are necessary to operate the DSP 7 are stored in an electrically erasable programmable read-only memory (EEPROM) 5. A memory card of a user is attached to a memory card interface 6.

The digital image signal that is output from the DSP 7 is converted into a display signal of a liquid crystal display (LCD) panel by an LCD driver 14 and an image is displayed on a color LCD panel 17.

The digital image signal that is output from the DSP 7 may be transmitted through serial communication via a universal serial bus (USB) connector 18 or an RS232C interface 8 and a connector 19 of the RS232C interface 8, and may be transmitted as a video signal via a video filter 9 and a video output unit 20.

An audio processor 13 outputs an audio signal from a microphone MIC to the DSP 7 or a speaker SP, and outputs an audio signal from the DSP 7 to the speaker SP.

A user input unit INP may include a shutter button, a mode button, a function button, a zoom button, and/or a direction button. The user input unit INP is manipulated by the user to generate commands for various functions according to the user's instruction. A microcontroller 12 controls a lens driver 10, and thus a zoom motor MZ, a focus motor MF, and an aperture motor MA respectively drive the zoom lens, the focus lens, an aperture in the optical system OPS. Examples of a light-emitter LAMP that is driven by the microcontroller 12 may include a self-timer lamp, an AF lamp, and a flash ready lamp. The microcontroller 12 drives a flash 15 by controlling an operation of a flash controller 11 according to a signal from a flash-photo sensor 16. The microcontroller 12 may be integrated with the DSP 7 into one chip.

Figure 2:
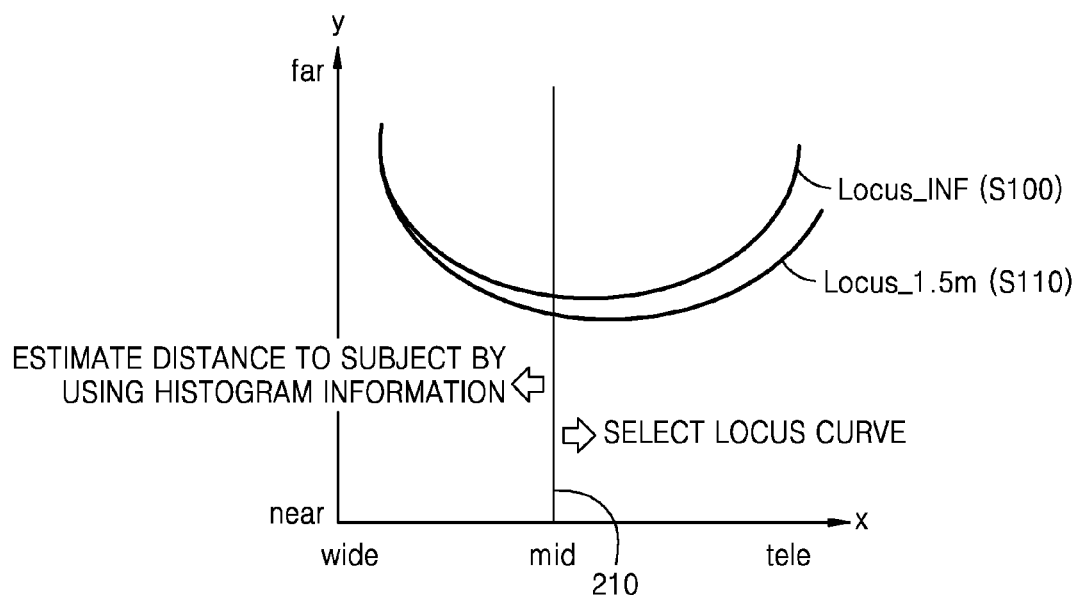
FIG. 2 is a graph for explaining an improved zoom-tracking method performed by an imaging apparatus, according to an exemplary embodiment.

FIG. 2 is a graph for explaining an improved zoom-tracking method performed by an imaging apparatus, according to an exemplary embodiment.

Examples of the imaging apparatus include a closed-circuit television (CCTV), a closed TV, a box CCTV, a camera, a smartphone, a laptop computer, a computer, a hand-held device, and an apparatus including a camera module.

The imaging apparatus may receive an input image that is output from an image sensor including a color filter and a near-infrared filter.

In this case, the color filter transmits a light component having a visible band that ranges from about 400 nm to about 700 nm such as RGB from among visible bands. The near-infrared filter transmits a light component in a near-infrared band that ranges from about 700 nm to about 1100 nm from among non-visible bands.

The imaging apparatus may receive a visible image or a thermal fusion image, or may receive an input image including both a visible image and a thermal fusion image.

In FIG. 2, the x-axis represents a position of a zoom lens and a zoom magnification (e.g., Wide to Tele) and the y-axis represents a position of a focus lens.

A process of enlarging a zoom magnification from 1× to N× is referred to as Tele, and a process of reducing a zoom magnification from N× to 1× is referred to as Wide. The y-axis represents Near/Far position information of the focus lens according to a zoom magnification.

In order to improve a zoom-tracking method according to an exemplary embodiment, a Mid point is chosen between a Wide point and a Tele point through which the zoom lens moves. A distance to a subject is estimated by using histogram information during an interval from the Wide point to the Mid point, a locus curve is selected based on the distance to the subject by using the histogram information during an interval from the Mid point to the Tele point, and zoom-tracking is performed, which will now be explained in detail.

According to an exemplary embodiment, a Mid point 210 is chosen between a Wide point and a Tele point through which the zoom lens moves.

After the Mid point 210 is chosen, a locus curve is obtained through AF during an interval from the Wide point to the Mid point, and distance information about the subject is accumulatively stored as histogram information.

According to an exemplary embodiment, a surveillance camera uses infrared AF (IRAF), through-the-lens AF (TTLAF), or contrast detection AF (CDAF).

According to an exemplary embodiment, the Mid point 210 may use a value that is set by a user or a preset arbitrary value. Alternatively, a point from which a focus gap begins to be greater than a preset range between a subject at Inf S100 and a subject at 1.5 m S110 may be set to be the Mid point 210.

A distance to the subject is estimated by accumulatively tracking a position of the focus lens for achieving focusing and a zoom magnification based on the histogram information that is accumulatively stored till the Mid point 210.

A locus curve includes locus data indicating a correlation between the zoom magnification and the position information of the focus lens according to the distance to the subject.

The locus curve may be generated by obtaining the position of the focus lens for achieving focusing at a position of the zoom lens, and the distance to the subject may be estimated based on the generated locus curve. That is, when the zoom magnification and the position of the focus lens are obtained, the distance to the subject may be estimated by using the locus data.

Next, zoom-tracking is performed by selecting the locus curve based on the estimated distance to the subject during the interval from the Wide point to the Mid point 210.

Figure 3:
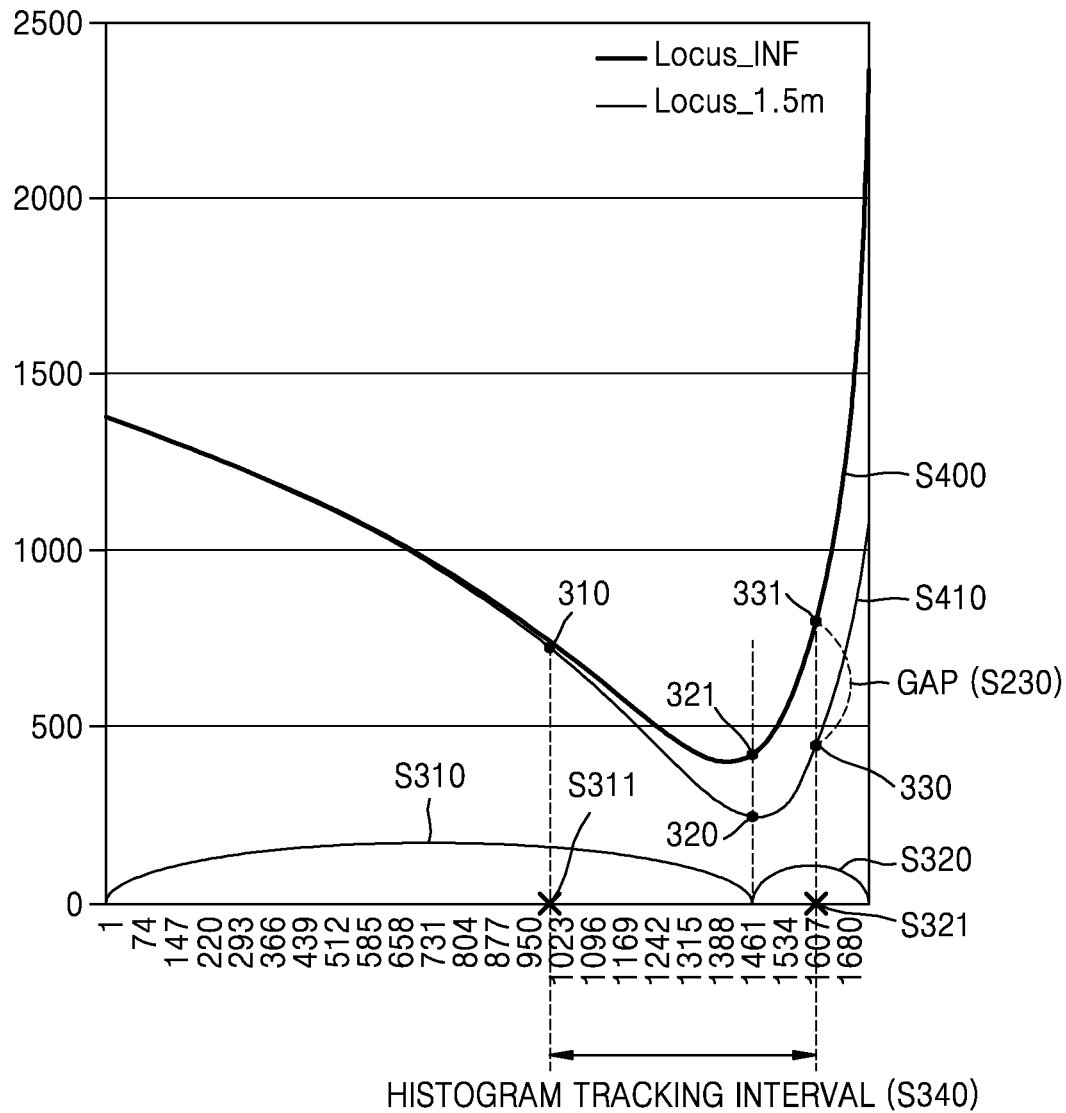
FIG. 3 is a graph for explaining an improved zoom-tracking method performed by an imaging apparatus, according to another exemplary embodiment.

FIG. 3 is a graph for explaining an improved zoom-tracking method performed by an imaging apparatus, according to another exemplary embodiment.

In FIG. 3, the x-axis represents a position of a zoom lens and a zoom magnification (e.g., Wide to Tele), and the y-axis represents a position of a focus lens.

A locus curve S400 when a distance to a subject (hereinafter, referred to as a subject at Inf) is Inf and a locus curve S410 when a distance to a subject (hereinafter, referred to as a subject at 1.5 m) is 1.5 m are shown.

Referring to FIG. 3, as the zoom lens moves from a Wide point to a Tele point and a focus range (Near to Far) is increased, a range for performing AF to obtain a locus curve is increased. In particular, since a variation of a focal spot according to a position of the subject is drastically increased at a high magnification, a zoom-tracking speed is reduced.

According an exemplary embodiment, in order to address the problem, AF is not performed at a high magnification during zoom-tracking, and a locus curve is selected by using stored histogram data.

In detail, during a specific interval S340, distance information about the subject is stored as histogram information by obtaining a locus curve by performing AF. During an interval other than the specific interval S340, a distance to the subject is estimated by using the histogram information that is stored, and zoom-tracking is rapidly performed by selecting a locus curve based on the estimated distance to the subject.

The locus curve includes locus data indicating a correlation between a zoom magnification and position information of the focus lens according to the distance to the subject.

The locus curve may be generated by obtaining a position of the focus lens for achieving focusing at a position of the zoom lens, and the distance to the subject may be estimated based on the generated locus curve. That is, when the zoom magnification and the position of the focus lens are obtained, the distance to the subject may be estimated by using the locus data.

According to an exemplary embodiment, a start point S311 of the specific interval S340 is chosen to be a point at which resolution is ensured according to characteristics of a lens. For example, the start point S311 may be a point from which resolution becomes greater than a predetermined value. An end point S321 of the specific interval S340 is chosen to be a point, e.g., points 330 and 331, from which a focus gap begins to be greatly increased between the subject at Inf and the subject at 1.5 m.

According to an exemplary embodiment, a start point 310 of the specific interval S340 may be chosen to be a point that is ⅔ between a Wide point and a Mid point. In this case, the Mid point is chosen to be inflection points 320 and 321 of the locus curve.

According to an exemplary embodiment, intermediate points between a Tele point and the Mid point may be chosen to be the points 330 and 331 of the specific interval S340.

Preferably, but not necessarily, distance information about the subject during an interval from a point that is ⅔ between the Wide point and the Mid point to an intermediate point between the Mid point and the Tele point is stored as histogram information. After the intermediate point, e.g., the points 330 and 331, between the Mid point and the Tele point, a distance to the subject is estimated based on the histogram information that is accumulatively stored. Next, zoom-tracking is performed by selecting the locus curve based on the estimated distance to the subject.

According to another exemplary embodiment, distance information about the subject during an interval from the point 310 that is an inflection point between the Wide point and the Mid point to the points 330 and 331 that are intermediate points between the Mid point and the Tele point is stored as histogram information. Next, a distance to the subject is estimated based on the histogram information that is accumulatively stored. Next, zoom-tracking is performed by selecting the locus curve based on the estimated distance to the subject.

According to still another exemplary embodiment, distance information about the subject during an interval from the point 310 at which resolution is ensured according to characteristics of a lens between the Wide point and the Mid point to the points 330 and 331 that are intermediate points between the Mid point and the Tele point is stored as histogram information. Next, a distance to the subject is estimated based on the histogram information that is accumulatively stored. Next, zoom-tracking is performed by selecting the locus curve based on the estimated distance to the subject.

According to still another exemplary embodiment, distance information about the subject during an interval from an arbitrary point between the Wide point and the Mid point to the points 330 and 331 which are located between the Mid point and the Tele point and from which a focus gap begins to be greater than a preset range between the subject at Inf and the subject at 1.5 m is stored as histogram information. Next, a distance to the subject is estimated based on the histogram information that is accumulatively stored. Zoom-tracking is performed by selecting the locus curve based on the estimated distance to the subject.

Figure 4:
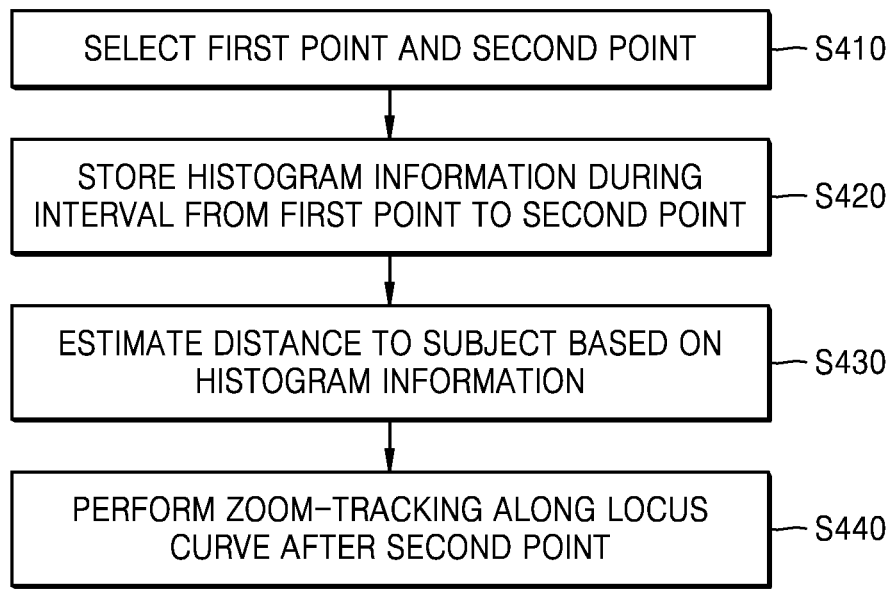
FIG. 4 is a flowchart illustrating an improved zoom-tracking method performed by an imaging apparatus, according to an exemplary embodiment.

FIG. 4 is a flowchart illustrating an improved zoom-tracking method performed by an imaging apparatus, according to an exemplary embodiment. In FIG. 4, two points between a Wide point and a Tele point between which a zoom lens moves are chosen, histogram information is tracked for an interval from the Wide point to the Tele point, a distance to a subject is estimated based on the histogram information that is accumulatively stored, and a locus curve is selected. After the locus curve is selected, zoom-tracking is performed along the locus curve.

In detail, in operation S410, in order to choose an interval for which histogram information is to be tracked between a Wide point and a Tele point between which a zoom lens moves, a first point and a second point are selected. The first point that is a start point may be set to be a point at which resolution is ensured according to characteristics of a lens between the Wide point and a Mid point or a point that is ⅔ between the Wide point and the Mid point. In this case, the Mid point may be set to be an inflection point of a locus curve. Also, the Mid point may be arbitrarily set by a user.

Also, the second point that is an end point may be set to be a point that is ½ between the Mid point and a Tele point. In this case, the Mid point may be set to be an inflection point of the locus curve. Also, the Mid point may be arbitrarily set by the user. Preferably, but not necessarily, the second point may be set to be a point that is located between the Mid point and the Tele point and from which a focus gap begins to be greater than a preset range between the subject at Inf and the subject at 1.5 m.

In operation S420, after the interval for which the histogram information is to be tracked is chosen, distance information about a subject is stored as the histogram information through AF during an interval from the first point to the second point. Next, in operation S430, a distance to the subject is estimated based on the histogram information that is accumulatively stored during the interval from the first point to the second point.

In operation S440, a locus curve is selected based on the estimated distance to the subject, and zoom-tracking is performed along the selected locus curve.

Figure 5:
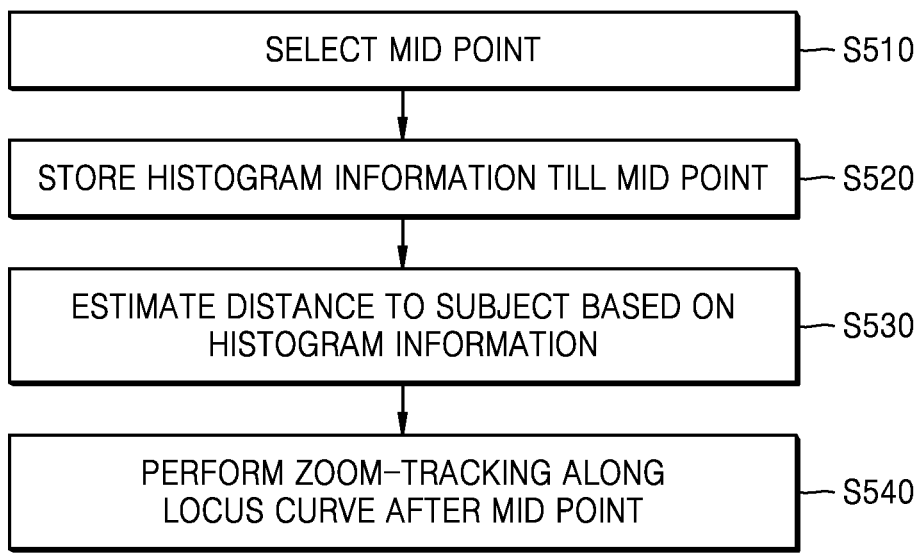
FIG. 5 is a flowchart illustrating an improved zoom-tracking method performed by an imaging apparatus, according to another exemplary embodiment.

FIG. 5 is a flowchart illustrating an improved zoom-tracking method performed by an imaging apparatus, according to another exemplary embodiment. In FIG. 5, one point is chosen between a Wide point and a Tele point between which a zoom lens moves, histogram information is tracked for an interval between the Wide point and the Tele point, a distance to a subject is estimated based on the histogram information that is accumulatively stored, and a locus curve is selected. After the locus curve is selected, zoom-tracking is performed along the locus curve.

In detail, in operation S510, a Mid point is chosen between a Wide point and a Tele point between which a zoom lens moves. In this case, the Mid point may be set to be a point (e.g., the points 330 and 331 of FIG. 3) from which a focus gap begins to be greater than a preset range between the subject at Inf and the subject at 1.5 m.

In operation S520, distance information about a subject is stored as histogram information through AF during an interval from the Wide point to the Mid point, and in operation S530, a distance to the subject is estimated based on the histogram information that is accumulatively stored till the Mid point. Next, in operation S540, a locus curve is selected based on the estimated distance to the subject, and zoom-tracking is performed along the selected locus curve after the Mid point.

Figure 6:
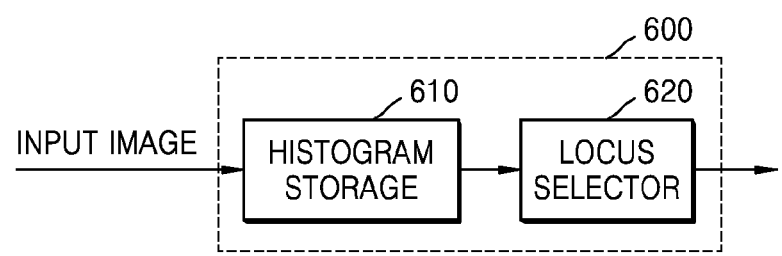
FIG. 6 is an internal block diagram illustrating an imaging apparatus for performing an improved zoom-tracking method, according to an exemplary embodiment.

FIG. 6 is an internal block diagram illustrating an imaging apparatus 600 for performing an improved zoom-tracking method, according to an exemplary embodiment.

According to an exemplary embodiment, the imaging apparatus 600 includes a histogram storage 610 and a locus selector 620.

The histogram storage 610 performs zoom-tracking through AF from a Wide point to an arbitrary point between the Wide point and a Tele point. Next, the histogram storage 610 accumulatively stores distance information about a subject as histogram information to obtain a locus curve through the AF.

The arbitrary point may be set to be a point from which a focus gap begins to be greater than a preset range between the subject at Inf and the subject at 1.5 m. Alternatively, the arbitrary point may be set to be an inflection point of a locus curve for the subject at Inf. Alternatively, the arbitrary point may be set to be an inflection point of the locus curve for the subject at 1.5 m.

The locus selector 620 estimates a distance to the subject based on the histogram information that is accumulatively stored in the histogram storage 610. The locus selector 620 selects a locus curve based on the estimated distance to the subject. The locus selector 620 performs zoom-tracking along the selected locus curve after the arbitrary point.

Figure 7:
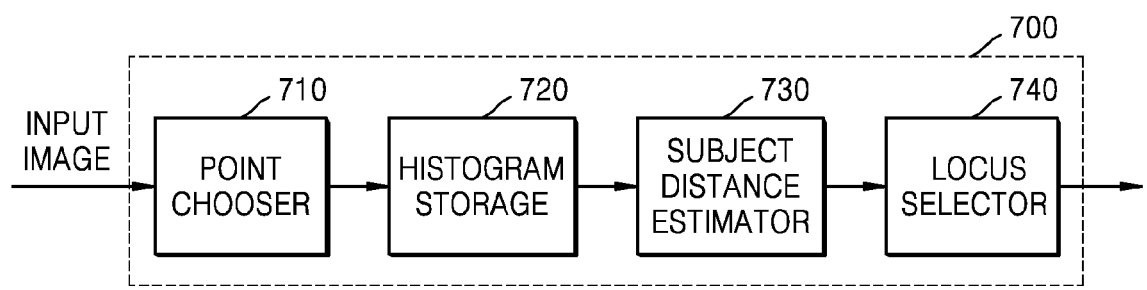
FIG. 7 is an internal block diagram illustrating an imaging apparatus for performing an improved zoom-tracking method, according to another exemplary embodiment.

FIG. 7 is an internal block diagram illustrating an imaging apparatus 700 for performing an improved zoom-tracking method, according to another exemplary embodiment.

According to an exemplary embodiment, the imaging apparatus 700 includes a point chooser 710, a histogram storage 720, a subject distance estimator 730, and a locus selector 740.

The point chooser 710 chooses a first point and a second d point between a Wide point and a Tele point between which a zoom lens moves. In this case, the first point is closer to the Wide point than the second point.

The first point may be set to be a point that is ⅔ between the Wide point and a Mid point. Also, the first point may be set to be a point at which resolution is ensured according to characteristics of a resolution between the Wide point and the Mid point. The second point may be set to be a point that is ½ between the Mid point and the Tele point.

In this case, the Mid point may be set to be an inflection point of a locus curve. Alternatively, the Mid point may be arbitrarily set by a user.

The histogram storage 720 performs zoom-tracking through AF during an interval from the first point to the second point. The histogram storage 720 accumulatively stores as histogram information distance information about a subject to obtain a locus curve through the AF.

The subject distance estimator 730 estimates a distance to the subject based on the histogram information that is stored in the histogram storage 720.

The locus selector 740 selects a locus curve based on the estimated distance to the subject. Next, zoom-tracking is performed based on the selected locus curve after the second point.

According to the above exemplary embodiments, a zoom-tracking speed is not reduced even when a zoom magnification is changed to Tele during a zoom-tracking process. Also, a zoom-tracking speed is not reduced even at a low illuminance or in an environment where a spot light source exists.

The inventive concept may be embodied as computer-readable codes in a computer-readable recording medium. The computer-readable recording medium may be any recording apparatus capable of storing data that is read by a computer system.

Examples of the computer-readable recording medium include read-only memories (ROMs), random-access memories (RAMs), CD-ROMs, magnetic tapes, floppy disks, and optical data storage devices. The computer-readable medium may be distributed among computer systems that are interconnected through a network, and the present invention may be stored and implemented as computer-readable codes in the distributed system.

At least one of the components, elements or units represented by a block as illustrated in FIGS. 6 and 7 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like While the inventive concept has been particularly shown and described with reference to exemplary embodiments thereof using specific terms, the embodiments and terms have been used to explain the inventive concept and should not be construed as limiting the scope of the inventive concept defined by the claims.

Accordingly, it will be understood by those of ordinary skill in the art that various changes in form and details may be made therein without departing from the spirit and scope of the inventive concept as defined by the following claims.

What is claimed is:

1. A zoom-tracking method performed by an imaging apparatus, the method comprising:
choosing a first point and a second point between a Wide point and a Tele point, wherein the first point is closer to the Wide point than the second point;
storing distance information about a subject as histogram information by performing auto-focusing (AF) while a zoom lens moves from the first point to the second point;
estimating a distance to the subject based on the histogram information while the zoom lens moves from the second point toward the Tele point;
selecting a locus curve based on the estimated distance to the subject; and
performing zoom-tracking along the selected locus curve after the zoom lens reaches the second point.

2. The method of claim 1, wherein the first point is set as one from among a point that is ⅔ between the Wide point and a Mid point and a point from which resolution becomes greater than a predetermined value according to characteristics of the zoom lens, and
wherein the Mid point is located between the Wide point and the Tele point and is a point corresponding to an inflection point of the locus curve.

3. The method of claim 1, wherein the second point is set as a point that is ½ between a Mid point and the Tele point, and
wherein the Mid point is a point corresponding to an inflection point of the locus curve.

4. The method of claim 1, wherein the second point is a point that is located between a Mid point and the Tele point and from which a focus gap begins to be greater than a preset range between a subject at Inf and a subject at a predetermined distance, and
wherein the Mid point is located between the Wide point and the Tele point and is a point corresponding to an inflection point of the locus curve.

5. The method of claim 2, wherein the lens comprises a color filter that transmits a light component in a visible band, from among visible bands, which ranges from about 400 nm to about 700 nm.

6. The method of claim 2, wherein the lens comprises a near-infrared filter that transmits a light component in a near-infrared band, from among non-visible bands, which ranges from about 700 nm to about 1100 nm.

7. A zoom-tracking method performed by an imaging apparatus, the method comprising:
choosing a Mid point between a Wide point and a Tele point;
storing distance information about a subject as histogram information by performing auto-focusing (AF) while a zoom lens moves from the Wide point to the Mid point;
estimating a distance to the subject based on the histogram while the zoom lens moves from the Mid point toward the Tele point;
selecting a locus curve based on the estimated distance to the subject; and
performing zoom-tracking along the selected locus curve after the zoom lens reaches the Mid point.

8. The method of claim 7, wherein the Mid point is a point from which a focus gap begins to be greater than a preset range between a subject at Inf and subject at a predetermined distance.

9. An imaging apparatus for performing a zoom-tracking method, the imaging apparatus comprising:
a histogram storage configured to store distance information about a subject as histogram information by performing auto-focusing (AF) while a zoom lens moves between from a Wide point to an arbitrary point; and
a locus selector configured to estimate a distance to the subject based on the stored histogram information, select a locus curve based on the estimated distance to the subject, and perform zoom-tracking along the selected locus curve while the zoom lens moves from the arbitrary point to a Tele point.

10. The imaging apparatus of claim 9, wherein the arbitrary point is a point from which a focus gap begins to be greater than a preset range between a subject at Inf and a subject at a predetermined distance.

11. The imaging apparatus of claim 9, wherein the arbitrary point is an inflection point of the locus curve for the subject at Inf.

12. The imaging apparatus of claim 9, wherein the arbitrary point is an inflection point of the locus curve for the subject at a predetermined distance.

13. An imaging apparatus for performing an improved zoom-tracking method, the imaging apparatus comprising:
a point chooser configured to choose a first point and a second point between a Wide point and a Tele point;
a histogram storage configured to accumulatively store distance information about a subject as histogram information by performing auto-focusing (AF) while a zoom lens moves from the first point to the second point;
a subject distance estimator configured to estimate a distance to the subject based on the stored histogram information; and
a locus selector configured to select a locus curve based on the estimated distance to the subject, and perform zoom-tracking along the selected locus curve after the zoom lens reaches the second point.

14. The imaging apparatus of claim 13, wherein the first point is set as one from among a point that is ⅔ between the Wide point and a Mid point and a point at which resolution becomes greater than a predetermined value according to characteristics of the zoom lens,
wherein the Mid point is located between the Wide point and the Tele point, and is a point corresponding to an inflection point of the locus curve.

15. The imaging apparatus of claim 13, wherein the second point is set as a point that is ½ between a Mid point and the Tele point,
wherein the Mid point is a point corresponding to an inflection point of the locus curve.

16. The imaging apparatus of claim 13, wherein the second point is a point that is located between a Mid point and the Tele point and from which a focus gap begins to be greater than a preset range between a subject at Inf and a subject at a predetermined distance, and
wherein the Mid point is located between the Wide point and the Tele point and is a point corresponding to an inflection point of the locus curve.

17. The imaging apparatus of claim 13, wherein the lens comprises a color filter that transmits a light component in a visible band, from among visible bands, which ranges from about 400 nm to about 700 nm.

18. The imaging apparatus of claim 13, wherein the lens comprises a near-infrared filter that transmits a light component in a near-infrared band, from among non-visible bands, which ranges from about 700 nm to about 1100 nm.

* * * * *